United States Patent
Abney

(10) Patent No.: US 7,993,083 B1
(45) Date of Patent: Aug. 9, 2011

(54) STRAP LINKS STABILIZING SYSTEM FOR FLATBED TRUCKS AND ASSOCIATED USE THEREFOR

(76) Inventor: Donald C. Abney, Robert Lee, TX (US)

( * ) Notice: Subject to any disclaimer, the term of this patent is extended or adjusted under 35 U.S.C. 154(b) by 476 days.

(21) Appl. No.: 12/157,261

(22) Filed: Jun. 9, 2008

(51) Int. Cl.
 *B61D 45/00* (2006.01)
(52) U.S. Cl. .......................................... 410/100; 410/97
(58) Field of Classification Search .................. 410/102,
 410/103, 101, 116, 117, 96, 97, 100; 224/493,
 224/572, 924; *B61D 45/00*
 See application file for complete search history.

(56) References Cited

U.S. PATENT DOCUMENTS

| | | | |
|---|---|---|---|
| 3,957,285 A | | 5/1976 | Schlaeger |
| 4,373,841 A | | 2/1983 | Adler et al. |
| 5,063,641 A | * | 11/1991 | Chuan .............................. 24/197 |
| 5,193,955 A | * | 3/1993 | Chou ............................ 410/100 |
| 5,738,259 A | | 4/1998 | Allen |
| 6,032,916 A | * | 3/2000 | Holliday ....................... 248/505 |
| 6,048,145 A | | 4/2000 | Pedersen |
| 6,059,499 A | | 5/2000 | Bird |
| 6,113,327 A | | 9/2000 | Schrader |
| 6,209,768 B1 | * | 4/2001 | Boaz .............................. 224/314 |
| 6,394,720 B1 | * | 5/2002 | McCay .......................... 410/100 |
| 6,851,902 B2 | | 2/2005 | Stanley |
| 6,957,938 B1 | | 10/2005 | Beasley |

\* cited by examiner

*Primary Examiner* — Glenn Dayoan
*Assistant Examiner* — SunSurraye Westbrook
(74) *Attorney, Agent, or Firm* — Montgomery Patent and Design; Robert C. Montgomery; Joseph T. Yaksich

(57) ABSTRACT

A coupling apparatus for trucking straps used on flatbed trailer loads intended to hold stacked loads in a more secure manner while eliminating their tendency to shift during transit is herein disclosed. The apparatus provides a connecting link which takes the form of a flattened figure "8" with the approximate dimension of four-and-a-half (4½) inches wide and two-and-a-half (2½) inches tall. The link is used to hold one end of a conventional trucking strap, which is then looped around a load and then back through the other side of the link. The free end is then secured to a stationary object such as a rub bar on the edge of the flatbed trailer using a ratcheting buckle. Thus, the loop around the load is self tightening and automatically tightens in the event of a shifting load as is commonly the case with tubular loads such as PVC pipe, regular pipe, lumber and the like. The apparatus would be used on alternating sides of the load to provide a balanced bi-directional restraint.

15 Claims, 4 Drawing Sheets

STRAP LINKS STABILIZING SYSTEM FOR FLATBED TRUCKS AND ASSOCIATED USE THEREFOR

RELATED APPLICATIONS

The present invention was first described in an Official Record of Invention received on Jan. 31, 2007 at the offices of Montgomery Patent and Design in Washington, Pa. There are no previously filed, nor currently any co-pending applications, anywhere in the world.

FIELD OF THE INVENTION

The present invention describes a device and method for a strap link stabilizing system for flatbed trucks, which provides a means for a coupling apparatus for trucking straps used on flatbed trailers intended to hold stacked loads in a more secure manner while eliminating their tendency to shift during transit. While these straps are fastened securely during the initial loading process, shifting loads during transit, especially with loads such as large diameter pipe, cause the straps to loosen, and the loads to shift. In severe cases, the load can even fall from the flatbed trailer. Accordingly, there exists a need for a means by which load straps can be used on flatbed trailer loads prone to load shifting in a manner without the disadvantages as described above. The development of the invention herein described fulfills this need.

BACKGROUND OF THE INVENTION

U.S. Pat. No. 6,957,938 issued to Beasley discloses a cargo tie-down system. This patent does not appear to disclose a strap-like securement means with a ratcheting mechanism that attaches to the bed of a cargo transporting vehicle.

U.S. Pat. No. 6,851,902 issued to Stanley discloses a cargo tie-down system. This patent does not appear to disclose a single strap which is placed around the cargo and secured to the bed of the transport vehicle with a ratchet mechanism.

U.S. Pat. No. 6,113,327 issued to Schrader discloses an apparatus and system for securing cargo. This patent does not appear to disclose an apparatus with a strap-like securement means with a ratcheting mechanism that attaches to the bed of a cargo transporting vehicle.

U.S. Pat. No. 6,059,499 issued to Bird discloses a retractable cargo securement strap. This patent does not appear to disclose a device that possesses a strap which is threaded around the load and secured to the bed of the transporting vehicle with a clip attached to a ratcheting mechanism.

U.S. Pat. No. 6,048,145 issued to Pederson discloses a device for regulation of tension. This patent does not appear to disclose a device that possesses a strap-like securement means with a ratcheting mechanism that attaches to the bed of a cargo transporting vehicle.

U.S. Pat. No. 5,738,259 issued to Allen discloses a strap tensioning system for carrying bicycles. This patent does not appear to disclose a device that possesses a strap-like securement means with a ratcheting mechanism that attaches to the bed of a cargo transporting vehicle nor does it disclose a device for securing loads on flat bed trailers.

U.S. Pat. No. 4,373,841 issued to Adler and Nadherny discloses a quick release load securing device. This patent does not appear to disclose a device that possesses a clip with a ratcheting mechanism that secures to the bed of the transporting vehicle.

U.S. Pat. No. 3,957,285 issued to Schlaeger discloses a double spring cargo tie-down device. This patent does not appear to disclose a single strap which is placed around the cargo and secured to the bed of the transport vehicle with a ratchet mechanism.

SUMMARY OF THE INVENTION

In view of the foregoing disadvantages inherent in the prior art, it has been observed that there is need for a strap link stabilizing system for flatbed trucks, that provides a means for a coupling apparatus for trucking straps used on flatbed trailers intended to hold stacked loads in a more secure manner and eliminating the tendency to shift during transit.

The strap link stabilizing system provides a convenient and safe way to secure stacked loads on trailers.

The strap link stabilizing system is comprised of: a first flat hook, strapping, a connecting link, a ratcheting buckle and a second flat hook.

The strap link stabilizing system provides a connecting link taking the form of a flattened figure "8" to hold one end of a conventional trucking strap which is then looped around a load and then back through the other side of the invention.

The strap link stabilizing system free end of the strap is then secured to a stationary feature along the edge of the flatbed trailer.

The strap link stabilizing system loops around the load forming a self-tightening loop which automatically tightens in the event of a shifting load.

The strap link stabilizing system used in alternating pairs to provide a secure bi-directional restraint.

The strap link stabilizing system possesses a first flat hook that provides a sewn attachment means to a formed aperture thereupon the strapping via conventional textile methods.

The strap link stabilizing system further possesses a first flat hook and strapping which provide a large loop shape capable of encompassing a load.

The strap link stabilizing system first flat hook provides further attachment to a first aperture portion of the connecting link.

The strap link stabilizing system possesses a connecting link located thereupon the strapping to secure and establish said loop.

The strap link stabilizing system connecting link comprises a flattened figure "8" shape further comprising first and second apertures being suitable for attachment of the first flat hook and the strapping being slidingly inserted therethrough.

The strap link stabilizing system strapping is routed therethrough a second aperture portion of the connecting link extending in a downward direction being subsequently routed preferably therethrough a ratcheting buckle.

The strap link stabilizing system ratcheting buckle provides an attachment and tightening means of the device to the truck/trailer; however, any number of binding mechanisms such as lever binders, ratcheting binders, or the like may be provided with equal benefit and therefore should not be interpreted as a limiting factor of the present invention.

The strap link stabilizing system ratcheting buckle provides an attachment means to the truck/trailer via a conventional integral strap and second flat hook.

The strap link stabilizing system connecting link provides a self-tightening means to the strapping during installation as well as during transportation of the load.

The strap link stabilizing system strapping is slidingly engaged therethrough the second aperture, thereby providing a variable sized loop means around different sized loads.

The strap link stabilizing system ratcheting buckle is tightened, thereby causing a tensioning effect thereupon the strapping and a cinching of the strapping around the load, thereby increasing stability thereof.

The strap link stabilizing connecting link is envisioned to be approximately four-and-a-half (4½) inches wide and two-and-a-half (2½) inches tall and made using a rugged high-strength metal such as carbon steel, stainless steel, aluminum, or the like and may be sized to suit particular loading conditions.

The strap link stabilizing system may be used with a variety of loads such as, but not limited to, stacked piping, regular pipe, masonry products and lumber.

The strap link stabilizing system, when properly applied, in an alternating arrangement, provides an opposing and balancing side-to-side restraint to said load.

The strap link stabilizing system may be used to bundle and/or separate the upper and lower loads, thereby providing a gap therebetween lower and upper bundles allowing routing of the strap portion of the device therethrough.

The strap link stabilizing system may also be used adjacent opposing pairs, that in the case of longer truck/trailers carrying multiple stacked bundles, additional sets of four (4) devices are envisioned to be provided for each additional upper bundle.

The strap link stabilizing system possesses an attachment means to the truck/trailer along an outside edge to a rub bar or other stationary feature along an outer edge of the truck/trailer.

The strap link stabilizing system strapping comprises commercially available nylon or cotton strapping materials commonly used in the trucking industry being approximately two (2) to four (4) inches wide and supplied in various colors.

The strap link stabilizing system strapping may be introduced in a variety of standard lengths based upon anticipated loads and truck/trailer sizes.

The strap link stabilizing system may be used by performing the following steps: procuring devices in multiples of four (4) having lengths suitable to particular sized truck/trailers and loads, placing lower bundles of a load onto the truck/trailer, securing said lower bundles using conventional side-to-side attachment strapping and hardware in an expected manner, positioning pairs of alternating devices onto the lower bundles in a side-to-side pattern by disconnecting the first flat hook from the connecting link and draping the devices across the load, draping the end of the device including the ratcheting buckle, the second flat hook, and the connecting link on one side of the load, draping the end of the device including the first flat hook and the strapping on the remaining side of the load, placing the upper bundles of the load onto the truck/trailer, looping the length of strapping including the first flat hook over the top of the upper bundle portion of the load, hooking the first flat hook onto the connecting link, tightening the ratcheting buckles of adjacent pairs of devices in an alternating manner to maintain side-to-side balance, repeating the tightening of each pair of devices using the ratcheting buckles until all devices are tightened sufficiently, placing any supplemental strapping and/or binding equipment upon the load as desired by the operator, and benefiting from increased lateral stability of a load afforded the user of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
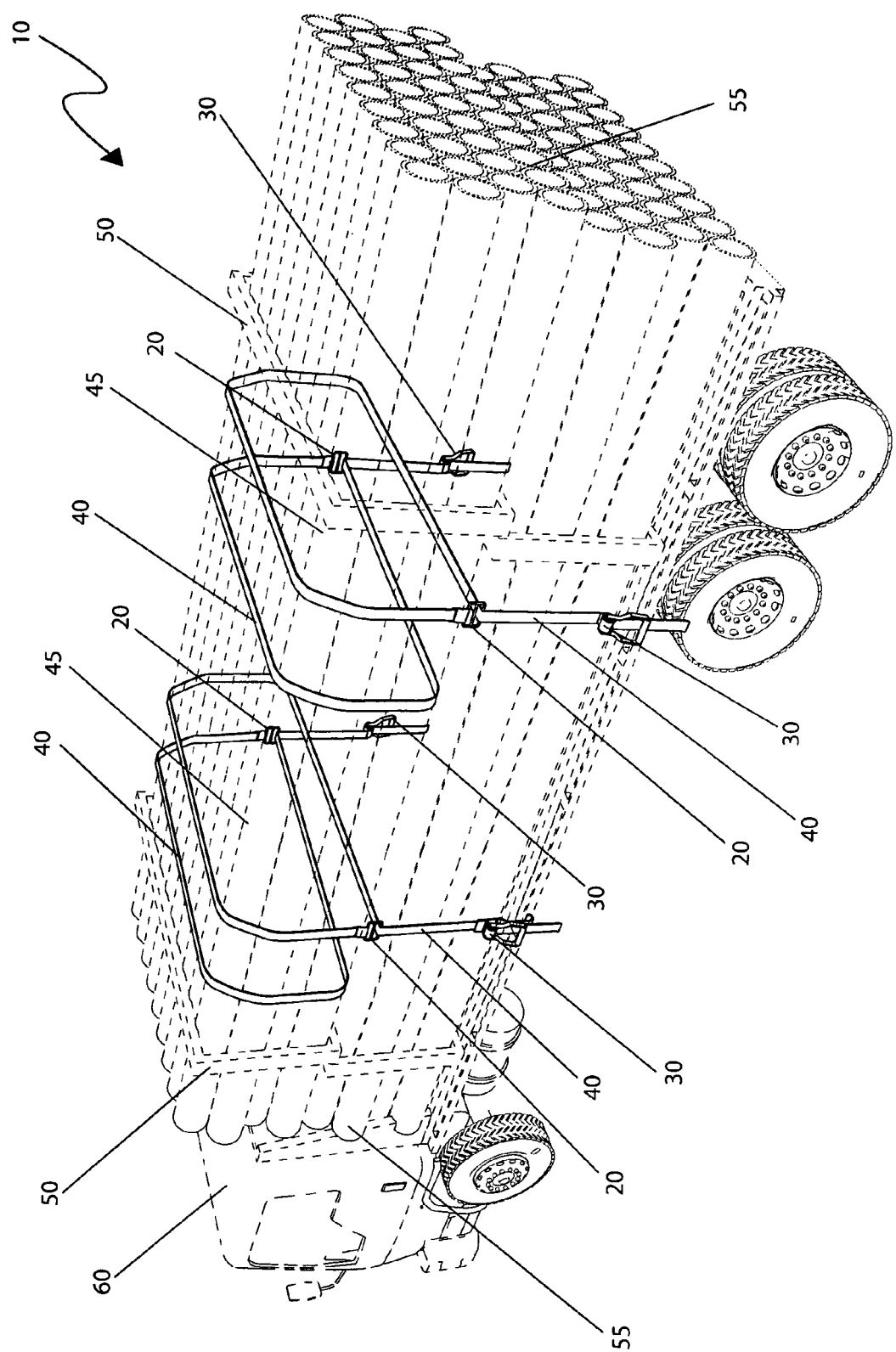
FIG. 1 is an environmental view of a strap link stabilizing system for flatbed trucks 10 shown securing a load 55, according to a preferred embodiment of the present invention.

DESCRIPTIVE KEY 10 strap link stabilizing system for flatbed trucks
20 connecting link
21 first aperture
22 second aperture
25 first flat hook
26 second flat hook
30 ratcheting buckle
40 strapping
45 loop
50 wood frame
55 load
60 truck/trailer

DETAILED DESCRIPTION OF THE PREFERRED EMBODIMENT

The best mode for carrying out the invention is presented in terms of its preferred embodiment, herein depicted FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a strap link stabilizing system for flatbed trucks (herein described as the "device") 10, which provides a means for a coupling apparatus for trucking straps 40 used on flatbed trailers 60 intended to hold stacked loads 55 in a more secure manner while eliminating their tendency to shift during transit. The device 10 provides a connecting link 20 taking the form of a flattened figure "8" to hold one end of a conventional trucking strap 40 which is then looped around a load 55 and then back through the other side of the invention 10. The free end is then secured to a stationary feature along the edge of the flatbed trailer 60. Thus, the device 10 loops around the load forming a self-tightening loop 45 which automatically tightens in the event of a shifting load. The device 10 would be used in alternating pairs to provide a secure bi-directional restraint.

Figure 2:
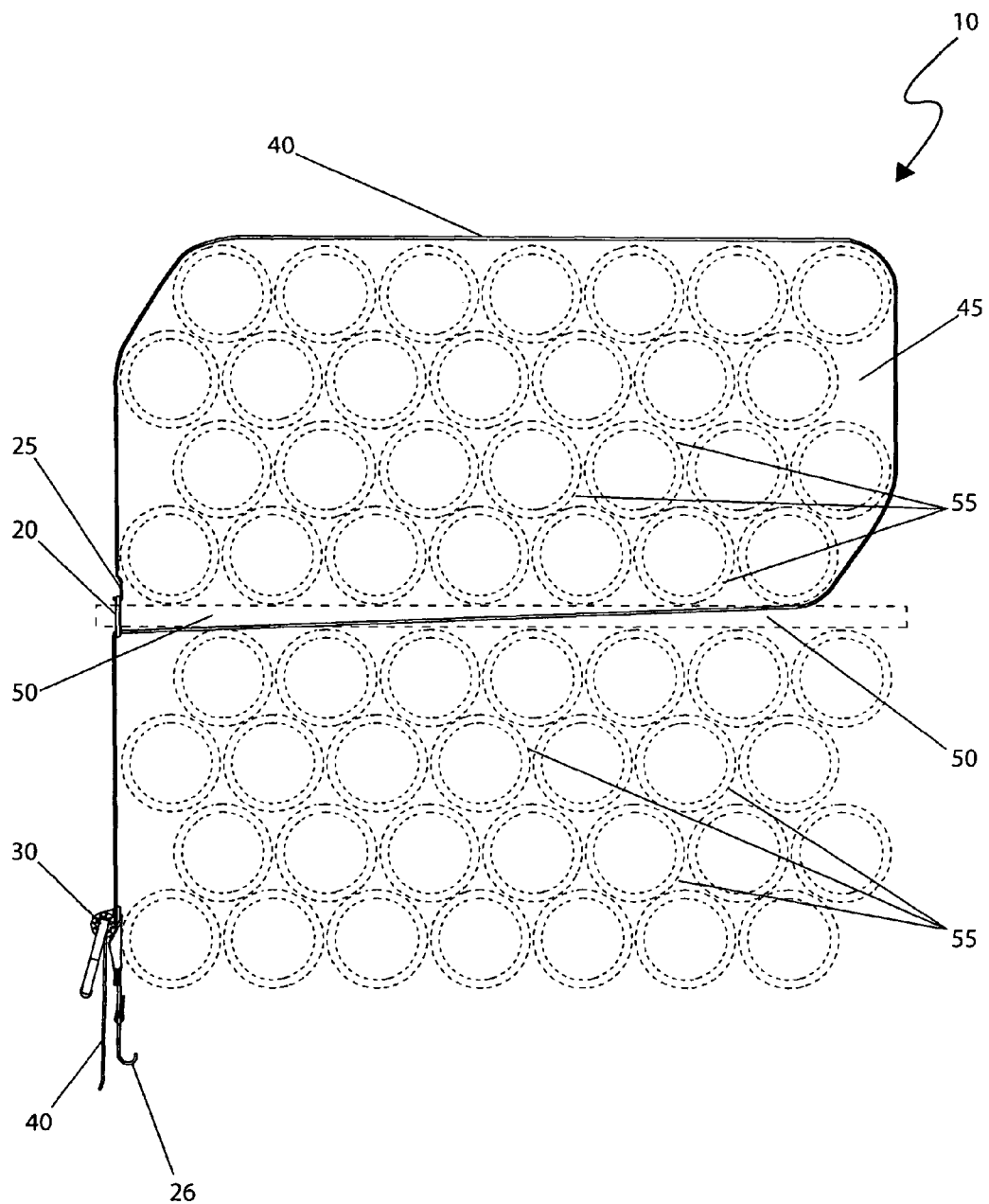
FIG. 2 is a side cut-away view of a strap link stabilizing system for flatbed trucks 10, according to a preferred embodiment of the present invention.

Referring now to FIGS. 1 and 2, an environmental view and a side cut-away view of the device 10 shown here securing a load 55, according to the preferred embodiment of the present invention, are disclosed. The device 10 is illustrated here providing a securing means to an upper bundle of stacked piping 55; however, the device 10 is not limited to the illustrated method of use, and a person skilled in the art will appreciate that many other types of loads 55 such as regular pipe, lumber, and the like are possible without deviating from the basic concept and as such should not be interpreted as a limiting factor of the present invention 10. Shown here are four (4) devices 10 being applied to an upper course of a piping load 55 in an alternating arrangement, thereby providing an opposing and balancing side-to-side restraint to said load 55. It is envisioned that the devices 10 be arranged in adjacent opposing pairs. It is also envisioned that horizontal boards or wood frames 50 be used to bundle and/or separate the upper and lower loads 55, thereby providing a gap therebetween lower and upper bundles 55 allowing routing of the strap portion 40 of the device 10 therethrough. In the case of longer truck/trailers 60 carrying multiple stacked bundles, additional sets of four (4) devices 10 are envisioned to be provided for each additional upper bundle 55. The device 10 provides an attachment means to the truck/trailer 60 along an outside edge to a rub bar or other stationary feature along an outer edge of the truck/trailer 60. It is also envisioned that any number of supplemental conventional side-to-side strapping components may be used in conjunction with the devices 10 being applied to lower bundles of said load 55 as well as overall extents of said load 55 as desired.

The strapping 40 comprises commercially available nylon or cotton strapping materials commonly used in the trucking industry being approximately two (2) to four (4) inches wide and supplied in various colors. The strapping 40 may be introduced in a variety of standard lengths based upon anticipated loads 55 and truck/trailer sizes 60. It is also envisioned that a plurality of devices 10 may be provided in kit form offering four (4) or eight (8) devices 10, for example.

Figure 3:
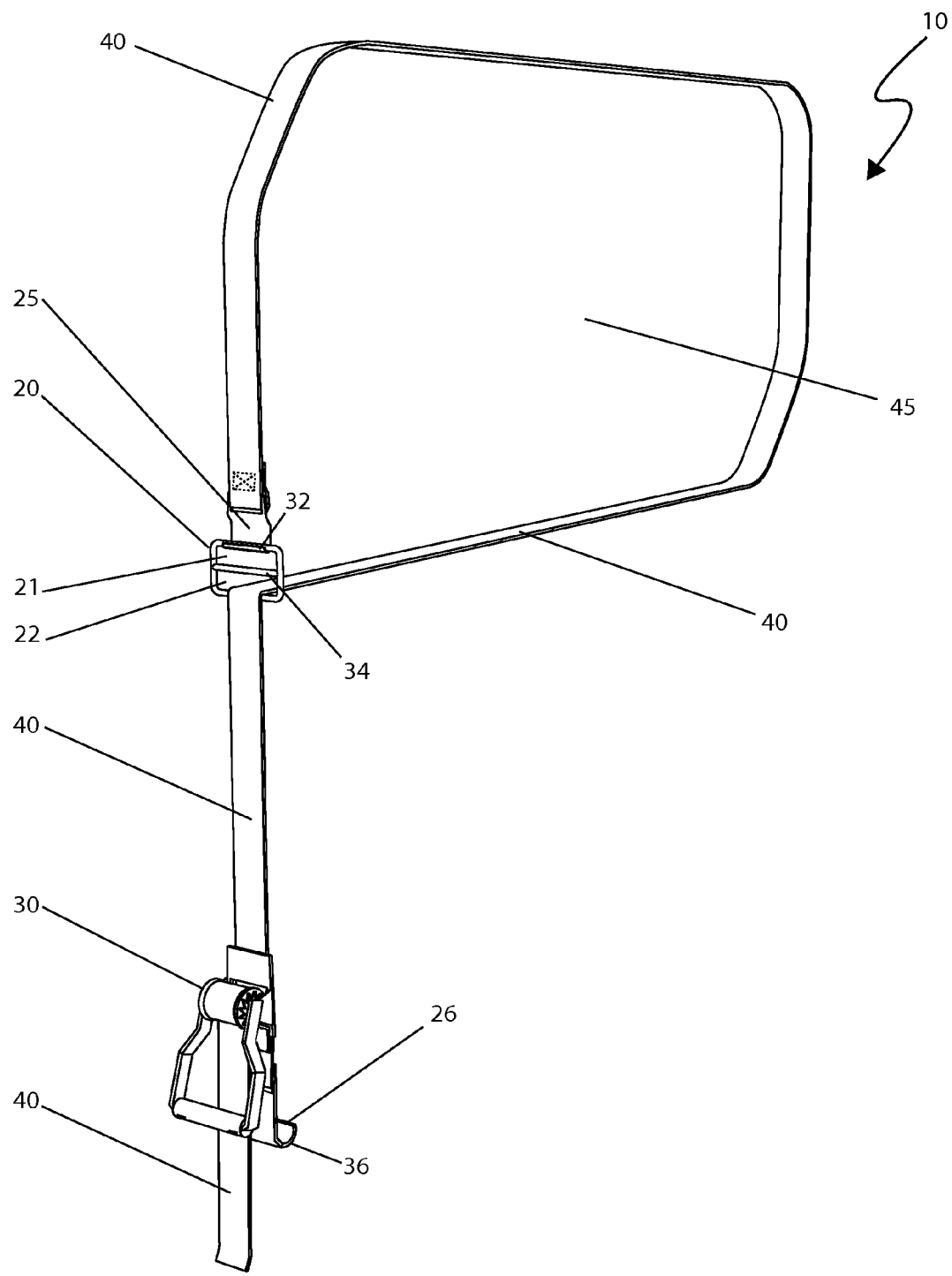
FIG. 3 is a perspective view of a strap link stabilizing system for flatbed trucks 10, according to a preferred embodiment of the present invention; and, FIG. 4 is a close-up view of a connecting link 20 and first flat hook 25 portions of a strap link stabilizing system for flatbed trucks 10, according to a preferred embodiment of the present invention.
Figure 4:
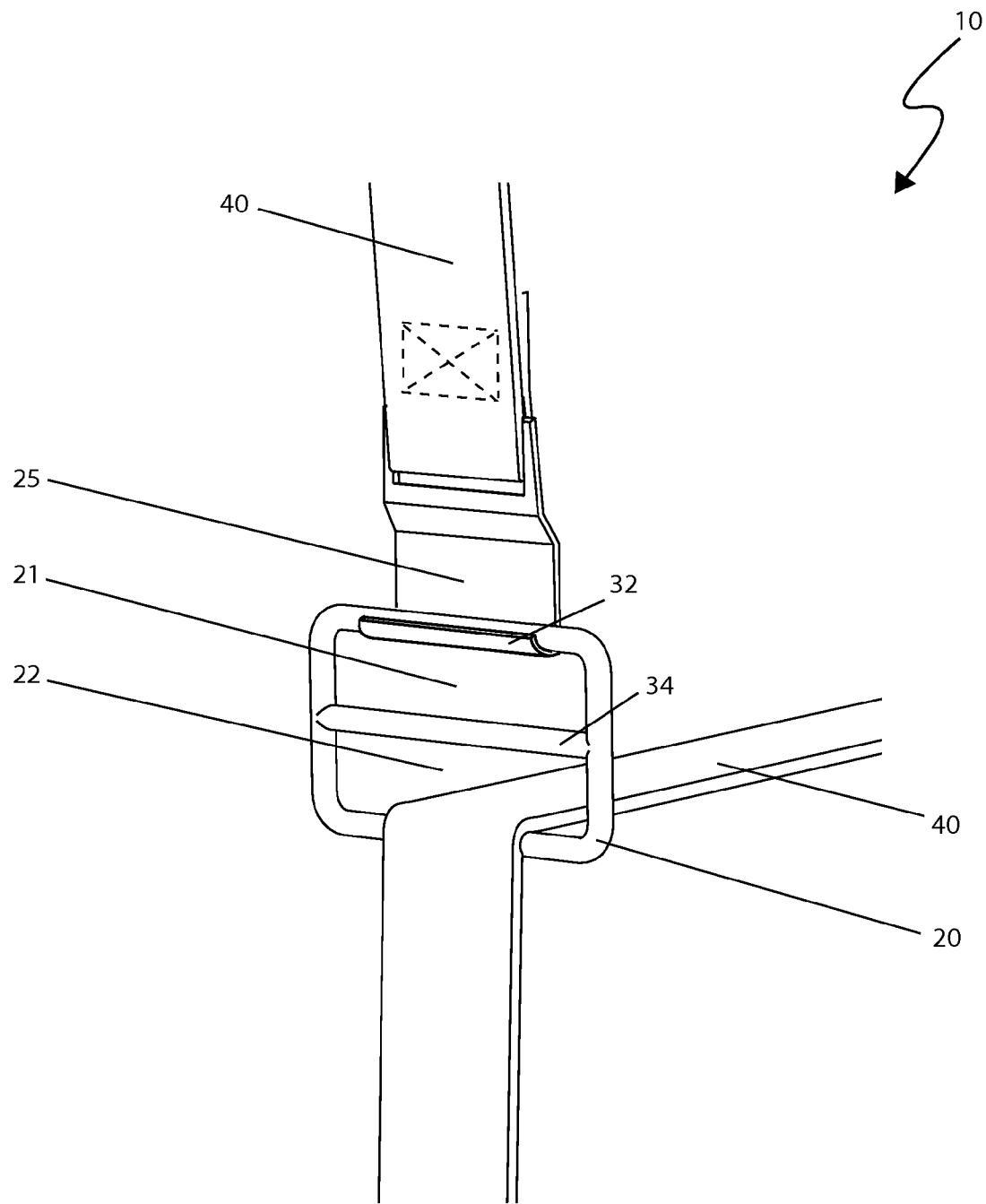

Referring now to FIGS. 3 and 4, a perspective view and a close up view of the device 10, according to the preferred embodiment of the present invention, are disclosed. The device 10 comprises a first flat hook 25 having a second arcuate bottom 32, strapping 40, a connecting link 20 having a divider 34, a ratcheting buckle 30, and a second flat hook 26 having a first arcuate bottom 36. The first flat hook 25 provides a sewn attachment means to a formed aperture thereupon the strapping 40 via conventional textile methods. The first flat hook 25 and the strapping 40 provide a large loop shape 45 capable of encompassing an upper load 55. The first flat hook 25 provides further attachment to a first aperture portion 21 of the connecting link 20. The connecting link 20 is to be located thereupon the strapping 40 to secure and establish said loop 45. The strapping 40 is routed therethrough a second aperture portion 22 of the connecting link 20 extending in a downward direction being subsequently routed preferably therethrough a ratcheting buckle 30. The ratcheting buckle 30 provides an attachment and tightening means of the device 10 to the truck/trailer 60; however, any number of binding mechanisms such as lever binders, ratcheting binders, or the like may be provided with equal benefit and therefore should not be interpreted as a limiting factor of the present invention 10. The ratcheting buckle 30 provides an attachment means to the truck/trailer 60 via a conventional integral strap and second flat hook 26.

The connecting link 20 provides a self-tightening means to the strapping 40 during installation as well as during transportation of the load 55. The connecting link 20 comprises a flattened figure "8" shape further comprising first 21 and second 22 apertures being suitable for attachment of the first flat hook 25 and the strapping 40 being slidingly inserted therethrough. Said strapping 40 is slidingly engaged therethrough the second aperture 22, thereby providing a variable sized loop 45 means around different sized loads 55. The ratcheting buckle 30 is tightened, thereby causing a tensioning effect thereupon the strapping 40 and a cinching of the strapping 40 around the load 55, thereby increasing stability thereof. The connecting link 20 is envisioned to be approximately four-and-a-half (4½) inches wide and two-and-a-half (2½) inches tall and made using a rugged high-strength metal such as carbon steel, stainless steel, aluminum, or the like and may be sized to suit particular loading conditions 55.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: procuring devices 10 in multiples of four (4) having lengths suitable to particular sized truck/trailers 60 and loads 55; placing lower bundles of a load 55 onto the truck/trailer 60; securing said lower bundles 55 using conventional side-to-side attachment strapping and hardware in an expected manner; positioning pairs of alternating devices 10 onto the lower bundles 55 in a side-to-side pattern by disconnecting the first flat hook 25 from the connecting link 20 and draping the devices 10 across the load 55; draping the end of the device 10 including the ratcheting buckle 30, the second flat hook 26, and the connecting link 20 on one side of the load 55; draping the end of the device 10 including the first flat hook 25 and the strapping 40 on the remaining side of the load 55; placing the upper bundles of the load 55 onto the truck/trailer 60; looping the length of strapping 40 including the first flat hook 25 over the top of the upper bundle portion of the load 55; hooking the first flat hook 25 onto the connecting link 20; tightening the ratcheting buckles 30 of adjacent pairs of devices 10 in an alternating manner to maintain side-to-side balance; repeating the tightening of each pair of devices 10 using the ratcheting buckles 30 until all devices 10 are tightened sufficiently; placing any supplemental strapping and/or binding equipment upon the load 55 as desired by the operator; and benefiting from increased lateral stability of a load 55 afforded the user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A strap link stabilizing system for securely holding a stacked load on a flatbed truck, said strap link stabilizing system comprising:

a connecting link;

a strap having a first end anchored to said connecting link, said strap further being looped around the load and having a second end passing through said connecting link, said second end terminating at a location subjacent to said connecting link; and, means for automatically tightening said strap when the load shifts;

wherein said strap is configured in a p-shaped pattern after adapted to be wrapped about the load.

2. The strap link stabilizing system of claim 1, wherein said means for automatically tightening comprises:

a first flat hook directly connected to said first end of said strap;

a ratcheting buckle engaged directly with said second end of said strap; and, a second flat hook directly connected to said second end of said strap.

3. The strap link stabilizing system of claim 2, wherein said connecting link comprises:

a body having a divider directly coupled thereto in such a manner that said body defines first and second aperture portions above and below said divider respectively;

wherein said first flat hook is engaged with an upper side of said body and thereby situated at said first aperture portion;

wherein said second end of said strap is positioned through said second aperture portion of said body and spaced from said first aperture portion.

4. The strap link stabilizing system of claim 3, wherein said second flat hook has a first arcuate bottom end facing inwardly towards the load while said first flat hook has a second arcuate bottom end facing outwardly away from the load.

5. The strap link stabilizing system of claim 1, wherein said connecting link has a flattened figure "8" shape.

6. The strap link stabilizing system of claim 1, wherein said strap has a continuous and unitary body traversing across top and bottom sides of the load.

7. A strap link stabilizing system for securely holding a stacked load on a flatbed truck, said strap link stabilizing system comprising:

a portable connecting link;

a flexible strap having a first end removably anchored to said connecting link, said strap further being looped around the load and having a second end adjustably and slidably positioned through said connecting link, said second end terminating at a location subjacent to said connecting link; and, means for automatically tightening said strap when the load shifts;

wherein said strap is configured in a p-shaped pattern after adapted to be wrapped about the load.

8. The strap link stabilizing system of claim 7, wherein said means for automatically tightening comprises:

a first flat hook directly connected to said first end of said strap;

a ratcheting buckle engaged directly with said second end of said strap; and, a second flat hook directly connected to said second end of said strap.

9. The strap link stabilizing system of claim 8, wherein said connecting link comprises:

a body having a divider directly coupled thereto in such a manner that said body defines first and second aperture portions above and below said divider respectively;

wherein said first flat hook is engaged with an upper side of said body and thereby situated at said first aperture portion;

wherein said second end of said strap is positioned through said second aperture portion of said body and spaced from said first aperture portion.

10. The strap link stabilizing system of claim 3, wherein said second flat hook has a first arcuate bottom end facing inwardly towards the load while said first flat hook has a second arcuate bottom end facing outwardly away from the load.

11. The strap link stabilizing system of claim 7, wherein said connecting link has a flattened figure "8" shape.

12. The strap link stabilizing system of claim 7, wherein said strap has a continuous and unitary body traversing across top and bottom sides of the load.

13. A method for securely holding a load on a flatbed truck, said method comprising the steps of:

providing a connecting link;

providing a ratcheting buckle;

providing a continuous strap having first and second flat hooks connected to first and second ends thereof respectively;

placing a lower bundle of the load onto the flatbed truck;

draping said first flat hook across a top side of the lower bundle;

draping said second flat hook across the top side of the lower bundle;

positioning said connecting link on one side of the lower bundle;

passing said second flat hook through a lower aperture portion of said connecting link; and, draping said first flat hook on a remaining side of the lower bundle.

14. The method of claim 13, further comprising the steps of:

placing an upper bundle of the load onto the flatbed of the truck;

looping said first flat hook over a top of the upper bundle of the load;

hooking said first flat hook to said connecting link;

attaching said ratcheting buckle to said second end of said strap; and, tightening said ratcheting buckle to maintain side-to-side balance of the top bundle.

15. The method of claim 14, further comprising the steps of:

placing supplemental strapping on the upper bundle as desired by the operator.

* * * * *